Aug. 9, 1955     C. J. FOGARTY ET AL     2,715,033
BICYCLE STABILIZER
Filed Sept. 20, 1952
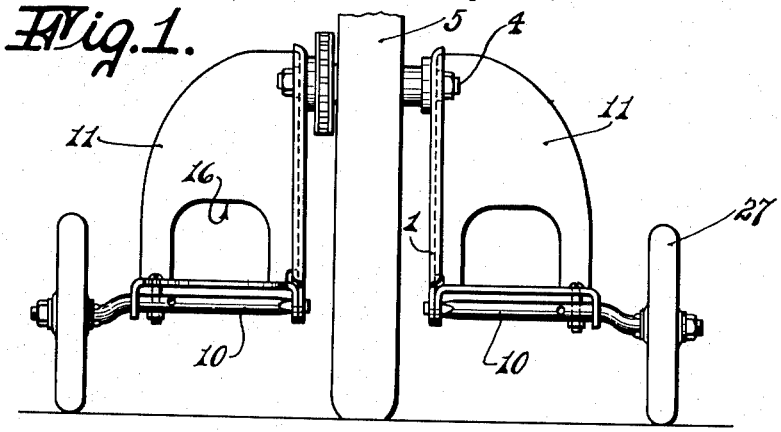
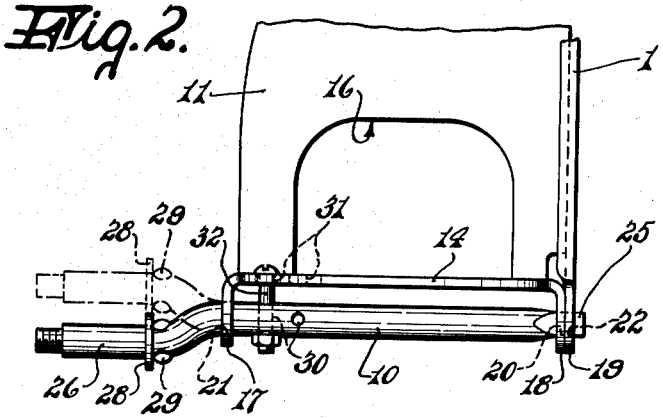
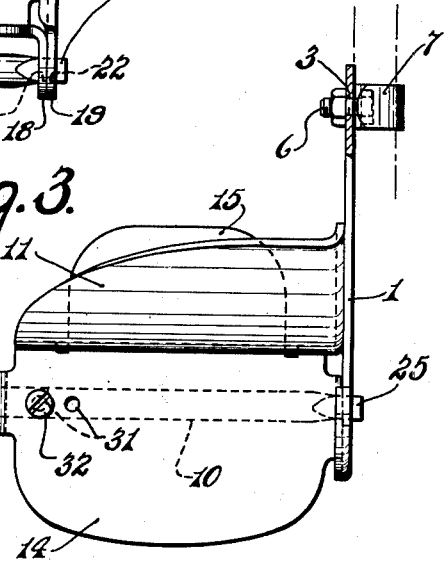
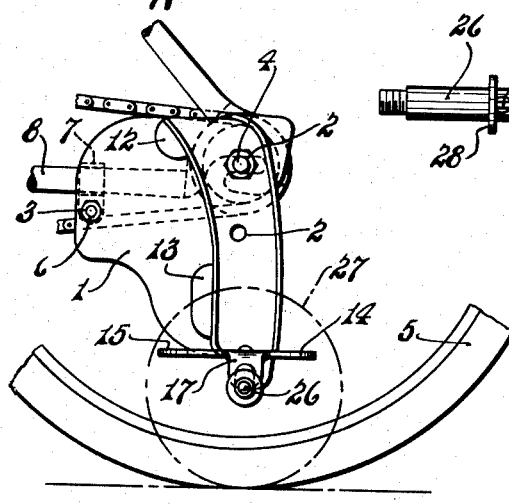
INVENTOR
CHARLES J. FOGARTY
AND HAROLD F. MASCHIN
BY Chapin & Neal
ATTORNEYS

# United States Patent Office 2,715,033
Patented Aug. 9, 1955

2,715,033

BICYCLE STABILIZER

Charles J. Fogarty and Harold F. Maschin, Westfield, Mass., assignors to The Westfield Manufacturing Company, Westfield, Mass., a corporation of Massachusetts Application September 20, 1952, Serial No. 310,702

1 Claim. (Cl. 280—304)

This invention relates to bicycle stabilizer apparatus and has for an object to provide a new type of structure for raising and lowering the wheels of the device with respect to the bicycle to which it is attached.

An object is also to provide a construction in which the user may adjust the elevation of the stabilizer wheels with a minimum of effort and with complete accuracy of adjustment with respect to the plane of each stabilizer wheel.

Another object is to provide a predetermined fixed support for the stabilizer frame attachment on a bicycle whereby the user may install the stabilizers without the necessity of adjusting the mounting of the stabilizer frames relative to the bicycle.

Stabilizer attachments for carrying auxiliary wheels laterally of the bicycle frame are in common use today on the smaller sizes of bicycles to limit the tipping thereof or to convert the bicycle into a tricycle type of vehicle, all to assist the beginner in learning to ride. In general practice the stabilizer wheels are first used to prevent tipping entirely and are then subsequently raised to higher elevations as the rider gains assurance. In time the auxiliary wheels may finally be discarded altogether. Stabilizer attachments are also commonly adapted for mounting on either a sixteen or twenty inch wheel size bicycle. Insofar as we are aware, such prior adjustable stabilizer atachments have a common difficulty in that the mounting of the same must be made with a certain amount of guesswork and trial and error methods in order to fix the two auxiliary wheels at the same elevation with respect to each other and with respect to the ground. Further, in changing the elevation of the wheels as to a higher position much the same amount of guesswork is again required as was the case in the initial installation. In the new construction of the present invention such adjustment by guesswork and trial and error methods is eliminated by incorporating in the stabilizer frame a predetermined fixed mounting for attachment to the bicycle frame and a cranked axle member, the frame being provided with hanger means and mechanism for securing the axle thereto in a plurality of rotative positions relative to the frame. Thus the wheel adjustment is accomplished by manipulating the stabilizer wheel axle.

Still further objects of the present invention are to provide a rugged durable type of stabilizer wheel frame and one in which is provided a platform or step plate for supporting a passenger in standing position at the rear of the bicycle.

The above and other specific objects and advantages of the new construction will be seen from the following description of an embodiment of the invention as shown by the accompanying drawings, in which, Fig. 1 is a rear elevation of the new stabilizer structure as attached to the rear of a bicycle;

Fig. 2 is a fragmentary view of one of the stabilizer frames to show details of construction;

Fig. 3 is a top plan of a stabilizer frame structure; and

Fig. 4 is a side elevation thereof as mounted on a bicycle frame.

Referring to the drawings the frame of the stabilizer is shown with a vertically disposed flat support plate 1 provided with a pair of vertically disposed spaced circular openings 2 (Fig. 4) adjacent the rear edge thereof and an opening 3 adjacent its forward edge. Plate 1 is adapted to be fixed to the bicycle with one of the rear openings receiving the axle 4 of the rear bicycle wheel 5. In the forward opening 3 is mounted a bolt 6 and clamp 7, the latter embracing a lower rear fork tube 8 as seen by Fig. 4. The stabilizer may be interchangeably placed on different bicycle sizes, the bicycle frame illustrated by Fig. 4 representing a twenty inch wheel size with the upper opening 2 engaging the rear axle and the clamp 7 turned upwardly. On the next smaller standard bicycle, or sixteen inch wheel size bicycle, the lower opening 2 may be attached to the rear axle thereof and the clamp 7 turned downwardly to embrace the lower rear fork tube in the same manner. In either event the support plate 1 is secured to the bicycle permanently in position until the child rider is prepared to discard the auxiliary stabilizer wheels entirely and the same are removed from the bicycle.

Fixed perpendicularly to the support plate 1 is a hanger frame means for mounting the stabilizer wheel axle shaft shown at 10. A vertically disposed plate portion 11 forming a bracing plate structure is provided with flanged inner edge flaps at 12 and 13 (Fig. 4). The flaps are joined as by integrally welding the same to the surface of plate 1 at the top and bottom thereof respectively. Plate 11 is forwardly curved to provide a more rigid bracing support and further acts as a shin guard plate for a child's legs when carried as a passenger on the step plate structure of the frame.

Integrally joined with the vertical plate portion 11 is the horizontal step plate section 14 bent rearwardly at right angles at the inner and outer lower marginal edge portions of plate 11. The plate is also formed with a forward extension 15 cut from the lower central section of plate 11. An arched opening 16 is thus provided in plate 11 through which a child's foot may extend when placed on the step.

Step plate 14 is provided rearwardly adjacent the lower forked ends of the vertical portion 11 with an outer and an inner edge flange as the depending ears 17 and 18. The inner ear 18 is joined to plate 1 as by welding the same to an eared portion 19 (Fig. 2) at the lower edge of plate 1. Axially aligned openings 20 and 21 are formed in the ears 17 and 18, the opening 20 of the inner ear 18 being adjacent to and in registration with an opening 22 formed in the portion 19 of plate 1. Openings 20 and 22 are preferably square sided for receiving a tapered squared end 25 of the axle shaft 10.

Axle shaft 10 is mounted to extend laterally of the bicycle with its inner end received in the inner squared openings. The outer portion is supported by the opening of ear 17. Extending beyond the ear 17 is an outer horizontally disposed cranked offset end portion 26 of the shaft for carrying the wheel 27 which is journaled thereon. The wheel is mouned on the cranked end between a usual threaded retaining bolt and a stationary stop washer 28 frictionally thrust in place on nibs 29 upset from the metal of the end 26.

Inwardly adjacent the ear 17 the axle shaft 10 is provided with two spaced holes 30 drilled at right angles to each other and preferably extending diametrically entirely through the shaft. Corresponding spaced holes 31 are drilled through the step plate 14 directly above openings 30 of the shaft. In Fig. 2 the shaft in full line position is shown with the outer end 26 in the lower position and the holes 30 and 31 to the left registered in axial alignment for receiving a retaining bolt 32 passing through the same. With the squared end 25 held against rotation in the openings 20 and 22 and the bolt 32 holding the shaft adjacent the outer ear 17 against rotation and longitudinal movement it will be seen that the axis of a wheel 27 on the offset end may be held securely in relation to the stabilizer frame. It will be apparent from Fig. 4 that the lower position of the wheel 27 is designed to bring said wheel in contact with the ground for fully balancing the bicycle and making the same in effect a four wheeled vehicle.

By simply removing the bolt 32 from the outer shaft opening 30, withdrawing the shaft outwardly from engagement with the openings 20 and 22, and then rotating the same a quarter or half turn, the shaft may be reinserted for changing the elevation of the wheel 7. A quarter turn either clockwise or counterclockwise brings holes 30 and 31 as at the right in Fig. 2 in axial registration to receive the bolt 32 and lock the shaft in place in an intermediate position of elevation relative to the frame. A half turn raises the cranked end 26 to its highest position as shown in dotted line with the bolt 32 again in the registered holes 30 and 31 at the left.

Thus by the simple rotative adjustment of the axle in the stabilizer frame three different elevations are obtainable without manipulation of the frame mounting attachment securing it to the bicycle frame. Further, since the cranked shafts on either side of the bicycle are identical in formation the elevation of both auxiliary wheels 7 are identical in the low, intermediate, and high positions and without further attention to the frame mountings.

It will be obvious that the mounting of the cranked shaft in the hanger structure as shown may be considerably varied. Either the squared end 25 with openings 20 and 22 or the bolt connection 32 through the shaft may be eliminated with one or the other serving alone to maintain the position of the cranked axis for the wheel 27. The bolt 32 serves to prevent longitudinal displacement of the shaft from the socket of the inner openings but other obvious expedients might be utilized. We prefer the arrangement shown since the squared socket holds the inner end against twisting and the bolt 32 holds the outer end against rotation as well as securing the shaft against longitudinal movement outwardly of the sockets.

What is claimed is:

Bicycle stabilizer wheel structure comprising a frame having a vertically disposed support plate member with a pair of vertically spaced openings defining fixed positions in the rear edge portion for selective attachment to the rear axle of a bicycle having a predetermined rear wheel diameter and a fixed positional opening adjacent the forward edge receiving a bolt and clamp for swinging the clamp into clamped engagement with a rear frame bar of the bicycle frame forwardly of said rear axle, hanger means including a vertically disposed brace plate portion arranged perpendicularly to said support plate and integrally joined thereto at the inner edges of the brace plate portion forwardly adjacent said rear openings of the plate member, a horizontally disposed step plate portion bent at right angles from said vertical portion and having a forward extension cut from the lower central section of said vertical portion, said step plate having inner and outer flanged ears depending therefrom with horizontal axially aligned openings therein, the inner ear being integrally joined to the wall of said support plate at the lower edge of the latter with said wall having a square sided opening registering with the opening of said inner ear, an axle shaft with a squared inner end received by said aligned openings and having an offset outer end parallel to said shaft outwardly of the outer opening and a wheel journaled thereon, said shaft being outwardly slidable to disengage said inner squared end and rotatively adjustable for support in said aligned openings at a selected elevation of said offset end relative to the support, spaced openings in said step plate above said shaft and correspondingly spaced openings at right angles to each other through said shaft, one of said openings in the plate being in registration and alignment with one of said shafts opening at selected quarterly intervals in the rotation of said shaft, and a bolt and nut assembly releasably mounted in registered openings of the step plate and shaft at one of said selected quarterly positions.

References Cited in the file of this patent

UNITED STATES PATENTS

| 561,262 | Lincoln | June 2, 1896 |
| 2,475,716 | Nabors | July 12, 1949 |
| 2,540,279 | Mosier | Feb. 6, 1951 |
| 2,601,994 | Richman | July 1, 1952 |
| 2,612,388 | McNeill et al. | Sept. 30, 1952 |

FOREIGN PATENTS

| 108,170 | Switzerland | Dec. 16, 1924 |
| 374,632 | Italy | Sept. 4, 1939 |